United States Patent [19]

Karan et al.

[11] Patent Number: 4,932,051
[45] Date of Patent: Jun. 5, 1990

[54] TELEPHONE NETWORK INTERFACE APPARATUS

[75] Inventors: Joel Karan, Millburn; Thomas J. Collins, Wall Township, both of N.J.

[73] Assignee: Keptel, Inc., Tinton Falls, N.J.

[21] Appl. No.: 390,539

[22] Filed: Aug. 7, 1989

[51] Int. Cl.$^5$ ............................................. H04M 1/00
[52] U.S. Cl. ................................... 379/399; 379/412; 379/327; 361/356; 361/426
[58] Field of Search ............... 379/399, 412, 442, 327, 379/329, 328; 361/334, 356, 426, 428

[56] References Cited

U.S. PATENT DOCUMENTS

| | | | |
|---|---|---|---|
| 4,651,340 | 3/1987 | Marson | 379/156 |
| 4,729,059 | 3/1988 | Wang | 361/356 |
| 4,796,289 | 1/1989 | Masor | 379/26 |
| 4,860,350 | 8/1989 | Smith | 379/412 |

OTHER PUBLICATIONS

MS-5, an interface system, 4/1986.

Primary Examiner—Jin F. Ng
Assistant Examiner—Jin F. Shehata
Attorney, Agent, or Firm—R. Gale Rhodes, Jr.

[57] ABSTRACT

Telephone network interface apparatus including a plurality of subscriber terminals for being connected to a plurality of subscriber premises lines, a plurality of telephone terminals for being connected to a plurality of incoming telephone lines, a plurality of telephone plugs and jacks for interconnecting and providing demarcation points between the incoming telephone lines and the subscriber premises lines, and mounting means for mounting the telephone network interface apparatus to the same bracket to which a prior art terminal block has been previously mounted whereby the telephone network interface apparatus of the present invention may be substituted for the prior art terminal block and both terminate and interconnect the plurality of incoming telephone lines and subscriber premises lines previously terminated and interconnected by the prior art terminal block and provide the needed demarcation points between the incoming telephone line and the subscriber premises lines.

7 Claims, 5 Drawing Sheets

TELEPHONE NETWORK INTERFACE APPARATUS

BACKGROUND OF INVENTION

As known to those skilled in the art, since the divestiture of the Regional Bell Operating Companies from the American Telephone & Telegraph Company, and since subscribers now commonly purchase subscriber equipment from numerous suppliers other than the American Telephone & Telegraph Company, there exists a need in the art for providing demarcation points at subscriber premises between incoming telephone lines and subscriber premises lines to facilitate determination of whether a fault exists on the incoming telephone lines or the subscriber premises lines.

As further known to those skilled in the art, such demarcation point is typically provided by a telephone plug and jack with the jack being connected to an incoming telephone line and with the plug being connected to a subscriber premises line. The plug is plugged into the jack to interconnect the incoming telephone line with the subscriber premises line and hence to the subscriber's telephone, and upon a fault occurring, the plug is unplugged from the jack and the plug of an operating telephone is plugged into the jack, and if dial tone is heard the fault is determined to be on the subscriber premises line, but if dial tone is not heard the fault is determined to be on the incoming telephone line.

As is still further known to those skilled in the art, at divestiture and largely since divestiture, the field was and largely still is replete with prior art terminal blocks mounted at subscriber premises for terminating and interconnecting a plurality of incoming telephone lines with a plurality of subscriber premises lines but which prior art terminal blocks include no structure for providing the needed demarcation points between the incoming telephone lines and the subscriber premises lines. Typically, as is still further known, the prior art terminal block is mounted to a bracket which is in turn mounted at subscriber premises such as to a subscriber premises wall.

Accordingly, there exists a need in the art for new and improved telephone network interface apparatus which may be substituted for such prior art terminal block, which may be mounted to the bracket to which the prior art telephone terminal block is typically mounted, and which may be substituted for the prior art terminal block and which will both terminate and interconnect the plurality of incoming telephone lines and plurality of subscriber premises lines formerly terminated and interconnected by such prior art terminal block, and advantageously, also provide the aboved-noted needed demarcation points between the incoming telephone lines and the subscriber premises lines for facilitation of the above-noted fault determination.

SUMMARY OF THE INVENTION

The object of the present invention is to satisfy the above-described need in the art.

Telephone network interface apparatus embodying the present invention and satisfying such need may include a plurality of subscriber terminals for being connected to a plurality of subscriber premises lines, a plurality of telephone terminals for being connected to a plurality of incoming telephone lines, a plurality of telephone plugs and jacks for interconnecting and providing demarcation points between the incoming telephone lines and the subscriber premises lines, and mounting means for mounting the telephone network interface apparatus to the same bracket to which the above-noted prior art terminal block has been previously mounted whereby the telephone network interface apparatus of the present invention may be substituted for the prior art terminal block and both terminate and interconnect the plurality of incoming telephone lines and subscriber premises lines and provide the needed demarcation points therebetween.

BRIEF DESCRIPTION OF THE DRAWINGS

FIG. 4A, is an enlarged partial view, in perspective, of the telephone circuit mounting members for the alternate embodiment of FIG. 6;

FIGS. 7 and 8 are alternate embodiments of subscriber wiring bridges which may comprise the present invention.

DESCRIPTION OF THE PREFERRED EMBODIMENT

Figure 1:
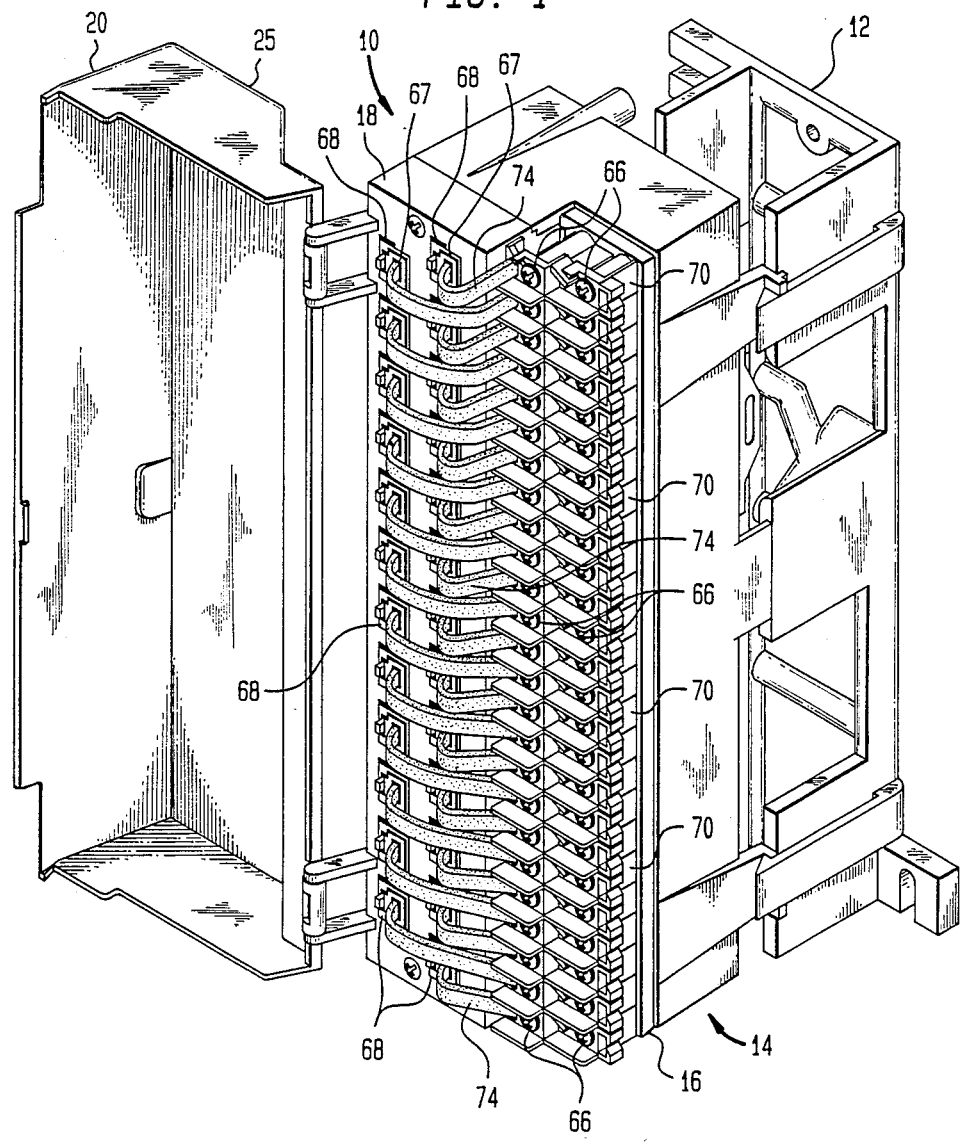
FIG. 1 is a perspective view of telephone network interface apparatus embodying the present invention shown mounted to a bracket of the type to which the above-noted prior art terminal blocks are typically mounted at subscriber premises and shown with the cover in the open position.
Figure 4:
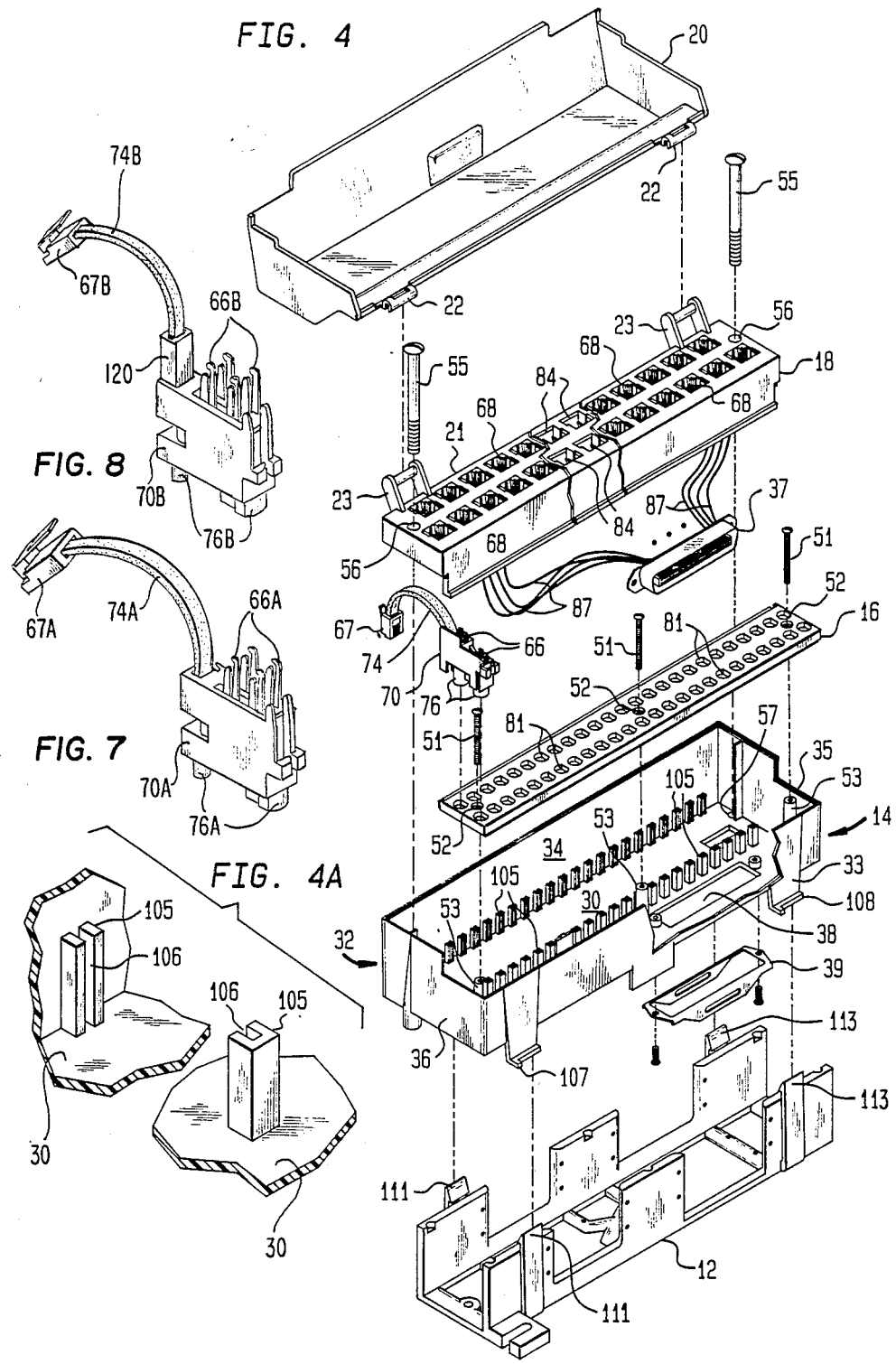
FIG. 4 is an exploded view of the telephone network interface apparatus of FIG. 1 illustrating assembly of the component parts thereof.

Referring now generally to the drawings, telephone network interface apparatus embodying the present invention is shown and indicated by general numerical designation 10. It will be understood that in the illustrative embodiment 10 shown, the telephone network interface apparatus 10 terminates and interconnects 25 incoming telephone lines and 25 subscriber premises lines and provides the needed demarcation points therebetween As so embodied, telephone network interface apparatus 10 may be advantageously substituted for the prior art terminal block referred to in the art as a 66M block. The 66M prior art terminal block terminates and interconnects 25 incoming telephone lines and 25 subscriber premises lines but provides no demarcation points between the lines. Also the apparatus 10 may be mounted advantageously to the prior art mounting bracket to which the prior art 66M block is typically mounted, namely, the prior art mounting bracket referred to in the art as an 89D mounting bracket and which prior art mounting bracket is shown in FIGS. 1 and 4 and indicated by numerical designation 12; the prior art mounting bracket 12 is for being mounted at subscriber premises such as on a subscriber's wall or the like. However, it will be understood that telephone network interface apparatus of the present invention is not so limited, that embodiment 10 shown in the drawings is merely illustrative of the present invention, and that telephone network interface apparatus embodying the present invention may be embodied to terminate and interconnect, and provide demarcation points between, different numbers of incoming telephone lines and subscriber premises lines and may therefore be substituted for different prior art terminal blocks other than the noted prior art 66M terminal block.

Figure 2:
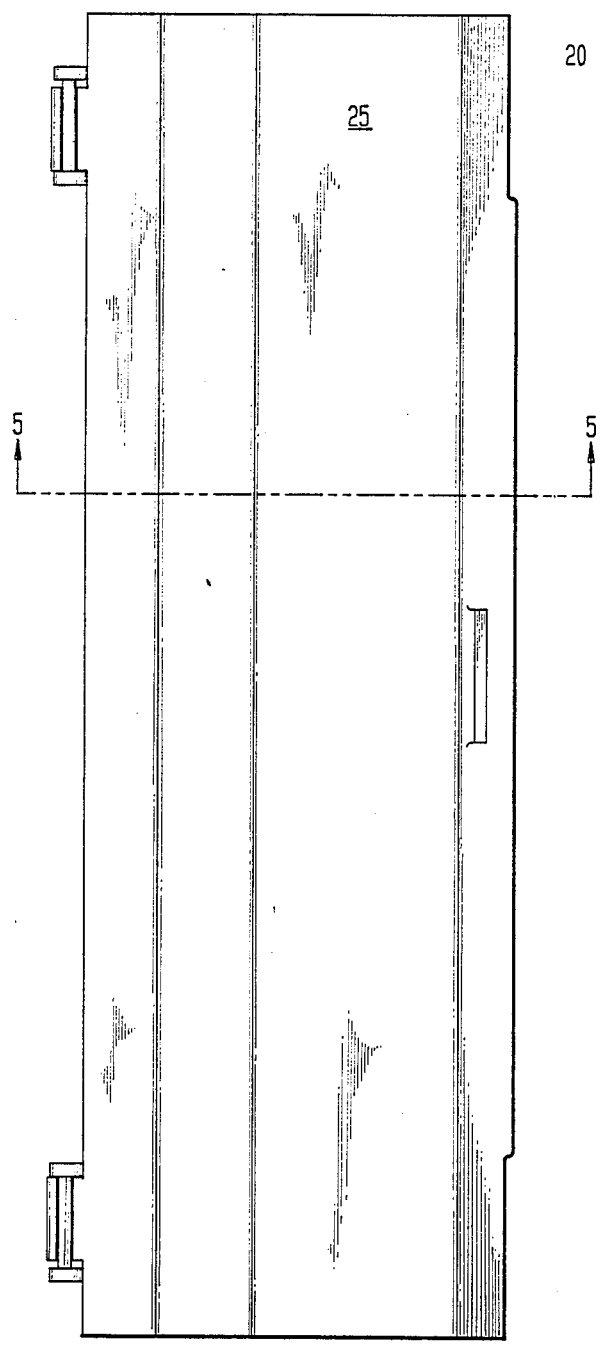
FIG. 2 is a front elevational view of the telephone network interface apparatus of FIG. 1 shown with the cover thereof closed.

Referring further to the drawings and in particular to FIGS. 1, 4, 5 and 6, and particularly FIG. 4, it will be understood that the telephone network interface apparatus 10 may include a base indicated by general numerical designation 14, a subscriber terminal mounting plate 16, a telephone jack mounting plate 18, and a cover 20 mounted hingedly to the outer edge portion 21 of the telephone jack mounting plate 18 by cooperative hinge members 22—22 and 23—23 as may be best seen in FIG. 4. The cover 20, FIG. 2, may be provided with a suitable front surface 25 which may be engraved with instructions for the utilization of the telephone network interface apparatus 10 and provide an area for recording telephone numbers, suite numbers, and the like.

Figure 5:
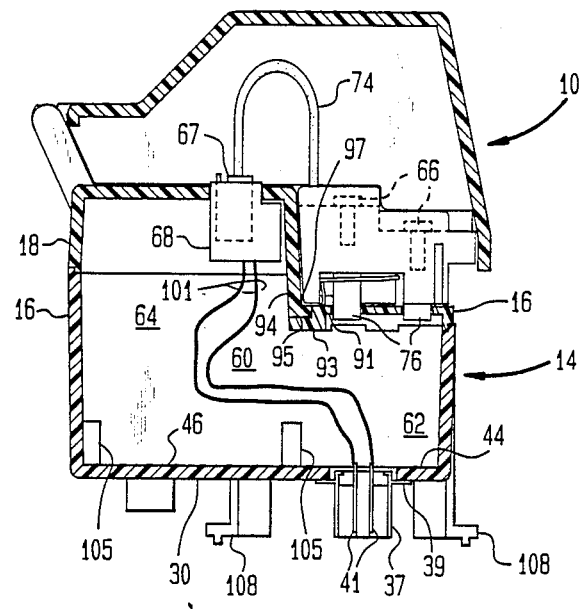
FIGS. 5 and 6 are alternate embodiment cross-sectional views taken generally along the line 5—5 in FIG. 2 and in the direction of the arrows, the embodiment of FIG. 5 is without the inclusion of telephone circuits and the embodiment of FIG. 6 includes telephone circuits, the views are partially diagrammatical for clarity and convenience of presentation.
Figure 6:
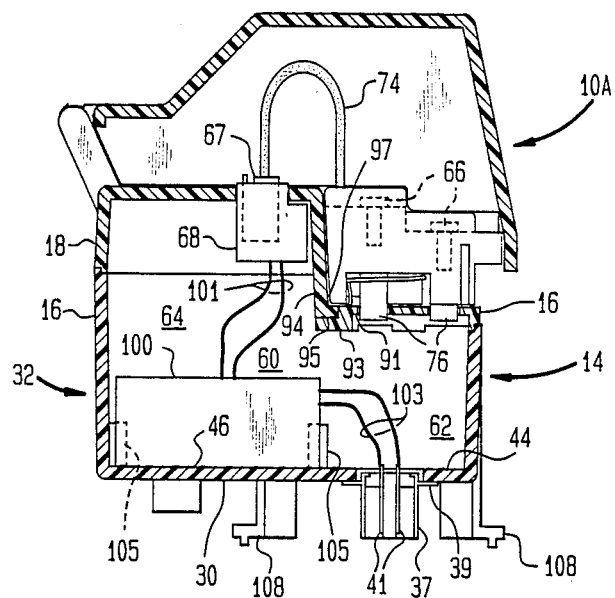

The base 14, FIGS. 4, 5 and 6, may include a bottom 30 circumscribed by an outwardly extending wall indicated by general numerical designation 32 and which wall 32 (FIG. 4) may include opposed side walls 33 and 34 and opposed top and bottom end walls 35 and 36. The apparatus 10 may further include an incoming telephone line connector 37 which may be mounted in an aperture 38 provided in the bottom 30 of the base 14 and may be mounted in the aperture by the mounting member 39 shown in FIG. 4; the incoming telephone line connector 37, in this embodiment, will be provided with 25 pairs of telephone terminals 41, FIGS. 5 and 6, for connection to 25 incoming telephone lines, not shown. As known by those skilled in the art, the incoming telephone and subscriber premises lines are each comprised of a pair of wires typically referred to in the art as the tip and ring and thus it will be further understood that the term line is used in the specification and the appended claims accordingly.

Referring particularly to FIGS. 5 and 6, it will be further understood that the bottom 30 is divided generally into right and left adjacent lateral portions indicated by numerical designations 44 and 46, respectively. As shown in FIGS. 5 and 6, the subscriber terminal mounting plate 16 generally overlies the rightward lateral portion 44 of the bottom 30 and the telephone jack mounting plate 18 generally overlies the open leftward lateral portion 46 of the bottom 30. As may be best understood from FIG. 4, the subscriber terminal mounting plate 16 is fastened to the base 14 over the right lateral portion 44 of the bottom 30 by a plurality of screws 51 inserted through apertures 52 formed in the subscriber terminal mounting plate 16 and threaded or screwed into the internally threaded mounting post 53 extending upwardly from the bottom 30 of the base 14; similarly, the telephone jack mounting plate 18 is fastened to the base 14 over the left lateral portion 46 of the bottom 30 by screws 55 inserted through apertures 56 formed in the telephone jack mounting plate 18 and threaded or screwed into threaded screw receiving apertures 57 (only one being shown in FIG. 4). With the subscriber terminal mounting plate 16 and the telephone jack mounting plate 18 being so fastened to the base 14, it will be understood that the bottom 30, wall 14, subscriber terminal mounting plate 16 and telephone jack mounting plate 18 cooperatively provide a closed compartment indicated generally by numerical designation 60, FIGS. 5 and 6, and divided generally into right internal compartment portion 62 and left internal compartment portion 64.

Figure 3:
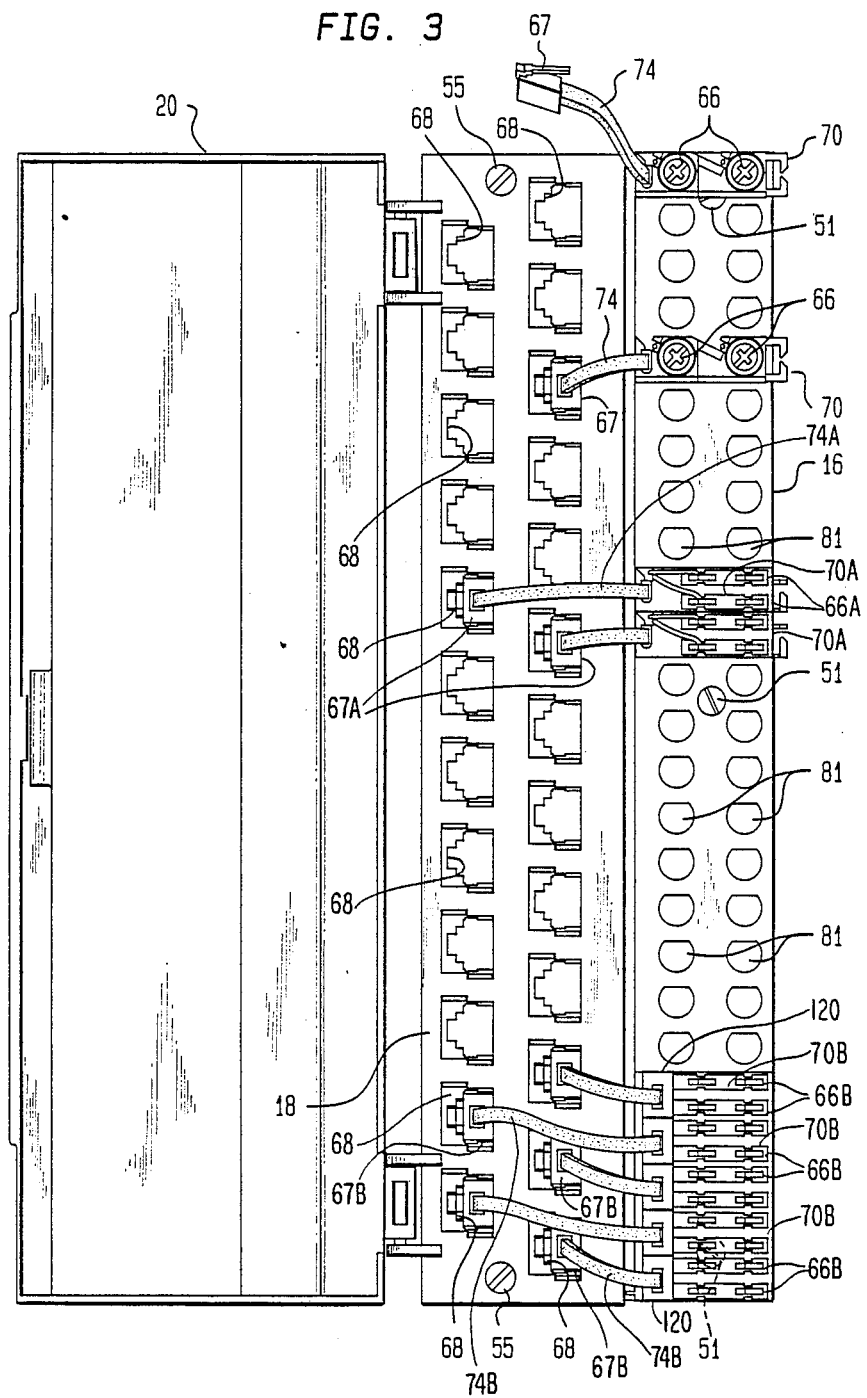
FIG. 3 is a front elevational view of the telephone network interface apparatus of FIG. 1 with the cover thereof shown in the open position, a plurality of telephone jacks, three alternate embodiments of pairs of subscriber terminals and associated telephone plugs are shown, the upper plug is shown unplugged from its associated jack and the lower plugs are shown plugged into their associated jacks.

Telephone network interface apparatus 10, FIGS. 1, 3 (upper portion) and 4, further includes a plurality of pairs of subscriber terminals each pair indicated by numerical designation 66; a plurality of telephone plugs, each plug indicated by numerical designation 67, and a plurality of telephone jacks, each jack indicated by numerical designation 68; it will be understood that in this embodiment 25 pairs of subscriber terminals 66 are provided, 25 telephone plugs, and 25 telephone jacks are provided.

Each pair of subscriber terminals 66, FIGS. 1, 3 (upper portion) and 4 is connected to a subscriber premises line (not shown) and each pair of subscriber terminals 66 may be provided on a subscriber wiring bridge 70 shown in FIGS. 1, 3 and 4 and a plurality of which subscriber wiring bridges 70 may also be included with the apparatus 10 of the present invention shown particularly in FIG. 1. As shown in FIG. 5, each pair of subscriber terminals 66 is connected to a telephone plug by a pair of electrical conductors included in a composite conductor indicated by numerical designation 74. Further, each subscriber wiring bridge 70, FIGS. 4, 5 and 6, is provided with a pair of downwardly extending cylindrical mounting members 76 for mounting of the bridge on the subscriber terminal mounting plate 16.

As may be best understood by reference again to FIG. 4, the subscriber terminal mounting plate 16 is provided with a plurality of pairs of apertures 81 for wedgedly receiving the cylindrical mounting members 76 of the subscriber wiring bridge to mount the subscriber wiring bridge on the subscriber terminal mounting plate 16. Similarly, the telephone jack mounting plate 18 is provided with a plurality of apertures each indicated by numerical designation 84 for receiving and having a telephone jack 68 snapped or wedged in place; in FIG. 4, the middle portion of the telephone jack mounting plate 16 shows the apertures 84 for receiving the telephone jacks 68 and the outer portions of the telephone jack mounting plate 16 show the telephone jacks 68 mounted in the apertures 84.

Referring to FIGS. 5 and 6, it will be noted that the subscriber terminal mounting plate 16 is provided with an inner edge portion 91 from which a flange 93 extends outwardly and that the telephone jack mounting plate 18 is provided with an inner edge portion 94 from which a flange 95 extends outwardly. The outwardly extending flange 93 of the subscriber terminal mounting plate 16 underlies the flange 95 of the telephone jack mounting plate 18 and it will be understood that upon the cylindrical mounting members 76 of the subscriber wiring bridge 70 being wedgedly received in a pair of apertures 81 formed in the subscriber terminal mounting plate 16, the outwardly extending portion 97 of the subscriber wiring bridge 70 is forced into engagement with the upper flange 95 provided on the telephone jack mounting plate 18 to force the flange 95 downwardly into engagement with the lower flange 93 provided on the subscriber terminal mounting plate 16. Accordingly, it will be understood with regard to the respective subscriber wiring bridge 70 shown in FIGS. 5 and 6, and recognizing that the same is true for all the plurality of subscriber bridges 70 shown in FIG. 1, that upon the subscriber mounting plate 16 being fastened to the base 14 by the screws 51 as described above, upon the telephone jack mounting plate 18 being fastened to the base 14 by the screws 55 as described above, and upon the flanges 93 and 95 being forced into engagement by the laterally extending portion 97 of the subscriber wiring bridge 70 as described above, structural rigidity is provided to the telephone network interface apparatus 10.

It will be understood that in the embodiment of the telephone network interface apparatus 10 of the present invention shown in FIG. 5 the jack 68 is connected to the incoming telephone line connector 37, and thereby to a pair of telephone terminals 41, by a pair of conductors 87.

The alternate embodiment of telephone network interface apparatus embodying the present invention is shown in FIG. 6 and indicated by general numerical designation 10A. Other than as specifically described hereinafter, it will be understood that telephone network interface apparatus embodiment 10A is the same as telephone network interface apparatus 10 described above and as particularly shown in FIG. 5. Telephone network interface apparatus 10A includes a plurality of telephone circuits such as Maintenance Termination Units, Half Ringers, RFI filters, with a representative telephone circuit being shown in FIG. 6 and indicated by numerical designation 100. As may be best understood by reference to both FIGS. 4 and 6, and particularly to FIG. 4A, the portion of the bottom 30 of the base 14 cooperatively providing the left internal compartment portion 64 is provided with opposed pairs of upwardly extending members 105 providing pairs of opposed slots 106 for wedgedly receiving a telephone circuit 100. In this embodiment, FIG. 6, the telephone jack 68 is connected to the telephone circuit 100 by a pair of conductors 101 and the telephone circuit 100 is connected to the incoming telephone line connector 37 and thereby to one of the pairs of telephone terminals 41.

With regard to the mounting of the telephone network interface apparatus 10 and 10A of the present invention to the prior art mounting bracket 12 shown in FIGS. 1 and 4, it will be understood that the bottom 30 of the base 14 is provided with pairs of downwardly and outwardly extending mounting members 107—107 and 108—108 (only one mounting member 107 and 108 of each pair being shown in the perspective view thereof in FIG. 4) for being wedged or snapped into engagement with pairs of upwardly extending opposed mounting members 111—111 and 113—113 provided on the prior art mounting bracket 12.

Referring again to the cover 20, it will be understood that this cover has been found to be useful, even though the telephone network interface apparatus of the present invention is typically mounted indoors at subscriber premises, by providing protection particularly to the pairs of subscriber line terminals 66 by preventing inadvertent shorting, or shorting out, of these terminals upon the terminals being struck unintentionally by some electrically conductive object or article such as the metal handle of a mop or broom.

Alternate embodiment subscriber wiring bridges 70A (FIG. 3, middle portion, and FIG. 7) and 70B (FIG. 3, lower portion, and FIG. 8) may comprise the present invention alternative to the subscriber wiring bridge 70 described above and best seen in FIG. 4. Pair of subscriber terminals 66A (FIG. 3, middle portion and FIG. 7) are provided on subscriber wiring bridge 70A and are connected to a telephone plug 67A by a pair of electrical conductors included in a composite conductor 74A; similarly, pair of subscriber terminals 66B (FIG. 3, lower portion, and FIG. 8) are provided on subscriber wiring bridge 70B and are connected to a telephone plug 67B by a pair of electrical conductors included in a composite conductor 74B. Unlike the pair of subscriber screw-type terminals 66 provided on subscriber wiring bridge 70 (FIG. 3), the pairs of subscriber terminals 66A and 66B are of the punch down type terminals known to the art and are for connection to subscriber premises lines not shown. The telephone plugs 67A and 67B are for being plugged into telephone jacks 68 as illustrated in FIG. 3 to interconnect incoming telephone lines and subscriber premises lines and are for being unplugged from the jacks to provide the above-noted demarcation points. Similar to subscriber wiring bridge 70, subscriber wiring bridges 70A and 70B are provided, respectively, with downwardly extending cylindrical mounting members 76A (FIG. 7) and 76B (FIG. 8) for being wedgedly received within the pairs of apertures 81 (FIG. 4) to mount the subscriber wiring bridges 70A and 70B to the subscriber terminal mounting plate 16. Unlike composite conductor 74A of FIG. 7 which is fixedly secured to the subscriber wiring bridge 70A, the composite conductor 74B of FIG. 8 is provided with a connector 120 for being removably plugged into the subscriber wiring bridge 70B; the connector 120 is provided with a pair of inwardly extending female connections (not shown) connected to the telephone plug 67B by conductor 74B and for receiving a pair of upwardly extending male connectors (not shown) provided on the subscriber wiring bridge 70B and connected to the pair of subscriber wiring terminals 66B. Subscriber wiring bridges 70A and 70B provided with the pairs of punch down type subscriber terminals 66A and 66B are used by interconnect companies which are companies that provide service between a subscriber and the local telephone company.

It will be understood that many modifications and variations may be made in the present invention without departing from the spirit and the scope thereof.

What is claimed is:

1. A telephone network interface apparatus for being mounted to a bracket located at subscriber premises and for terminating and interconnecting a plurality of incoming telephone lines and a plurality of subscriber premises lines and for providing a plurality of demarcation points therebetween, comprising:
   a base including a bottom circumscribed by an outwardly extending wall, said bottom divided generally into adjacent first and second lateral portions, and said base provided with first mounting means for mounting said base to said bracket;
   a subscriber terminal mounting plate for overlying said first lateral portion and for being fastened to said base, said subscriber terminal mounting plate provided with first mounting means for mounting a plurality of pairs of subscriber terminals thereon;
   a plurality of pairs of subscriber terminals for being mounted on said subscriber terminal mounting plate, each pair of subscriber terminals for being interconnected to one of said subscriber premises lines and provided with first electrical conductors one end of which is connected to said pair of subscriber terminals and the distant end of which is provided with a telephone plug;

a telephone jack mounting plate for overlying said second lateral portion of said base and for being fastened to said base, said telephone jack mounting plate provided with second mounting means for mounting a plurality of telephone jacks;

an incoming telephone line connector mounted on said bottom of said base and provided with a plurality of pairs of telephone terminals each for being connected to one of said incoming telephone lines;

a plurality of telephone jacks for being mounted on said telephone jack mounting plate, each jack provided with second electrical conductors one end of which is connected to the jack and the distant end of which is connected to one of said pairs of telephone terminals;

first fastening means for fastening said subscriber terminal mounting plate to said base and over said first lateral portion and second fastening means for mounting said jack mounting plate to said base and over said second lateral portion;

said telephone plugs for being plugged into said telephone jacks to interconnect said incoming telephone lines and said subscriber premises lines, and said telephone plugs for being unplugged from said telephone jacks to provide demarcation points between said incoming telephone lines and said subscriber premises lines to facilitate determination of whether faults exist on said incoming telephone lines or said subscriber premises lines;

a cover mounted hingedly to said telephone jack mounting plate and for being pivoted closed over said telephone jack mounting plate and said subscriber terminal mounting plate to cover said subscriber terminals and said telephone plugs and jacks and for being pivoted away from said subscriber terminal mounting plate and said telephone jack mounting plate to provide access to said subscriber terminals and said telephone plugs and jacks.

2. The telephone network interface apparatus according to claim 1 wherein said bottom, wall, subscriber terminal mounting plate and telephone jack mounting plate cooperatively provide a closed internal compartment divided generally into closed adjacent first and second internal compartment portions, the portion of said bottom cooperatively providing said closed first internal compartment portion provided with a bottom aperture and said incoming telephone line connector mounted in said bottom aperture and said closed second internal compartment portion for receiving and housing a plurality of telephone circuits for being interconnected between said telephone jacks and said pairs of telephone terminals, said closed second internal compartment portion provided with third mounting means for mounting said telephone circuits removably therein.

3. The telephone network interface apparatus according to claim 2 wherein said closed second internal compartment portion is provided with a plurality of pairs of opposed slots for wedgedly receiving said plurality of telephone circuits.

4. The telephone network interface apparatus according to claim 1 wherein said first mounting means comprise a plurality of pairs of apertures formed in said subscriber terminal mounting plate, wherein said plurality of pairs of subscriber terminals each comprise a subscriber wiring bridge including a pair of subscriber terminals for being connected to one of said subscriber premises lines, each subscriber wiring bridge comprising a pair of generally cylindrical mounting members for being received wedgedly in one of said pairs of apertures formed in said subscriber terminal mounting plate.

5. The telephone network interface apparatus according to claim 4 wherein said telephone jack mounting plate includes inner and outer edge portions and wherein said cover is mounted hingedly to the outer edge portion of said telephone jack mounting plate.

6. The telephone network interface apparatus according to claim 5 wherein said first fastening means comprise a plurality of internally threaded mounting posts extending upwardly from the portion of said bottom cooperatively providing said closed first internal compartment portion, a plurality of first screw receiving apertures formed in said subscriber terminal mounting plate and a plurality of screws for being inserted through said first screw receiving apertures and threaded into said internally threaded mounting posts; said second fastening means comprise a plurality of threaded screw receiving apertures provided in the portion of said bottom cooperatively providing said closed second internal compartment portion, a plurality of second screw receiving apertures formed in said telephone jack mounting plate and a second plurality of screws for being inserted through said second screw receiving apertures and threaded into said threaded screw receiving apertures; wherein said subscriber terminal mounting plate is provided with an inner edge portion, said inner edge portions of said telephone jack mounting plate and subscriber terminal mounting plate provided with outwardly extending flanges, the flange provided on said subscriber terminal mounting plate for underlying the flange provided on said telephone jack mounting plate and upon said telephone jack mounting plate and said subscriber mounting plate being fastened to said base said flanges cooperate in the closure of said open compartment and the provision of said closed internal compartment; said subscriber wiring bridges including outwardly extending portions for overlying and engaging said flange provided on said telephone jack mounting plate and upon said pairs of generally cylindrical members of said subscriber wiring bridges being received wedgedly in said pairs of apertures formed in said subscriber terminal mounting plates said outwardly extending portions of said subscriber wiring bridges being forced into engagement with said flange provided on said telephone jack mounting plate to force said flange provided on said telephone mounting plate into engagement with said flange provided on said subscriber terminal mounting plate; said first and second fastening means, said flanges and said outwardly extending portions of said subscriber wiring bridges cooperatively providing structural rigidity to the telephone network interface apparatus.

7. The telephone network interface apparatus according to claim 1 wherein said second mounting means comprise a plurality of apertures formed in said telephone jack mounting plate, said apertures for wedgedly receiving said plurality of telephone jacks.

* * * * *